Figure 1:
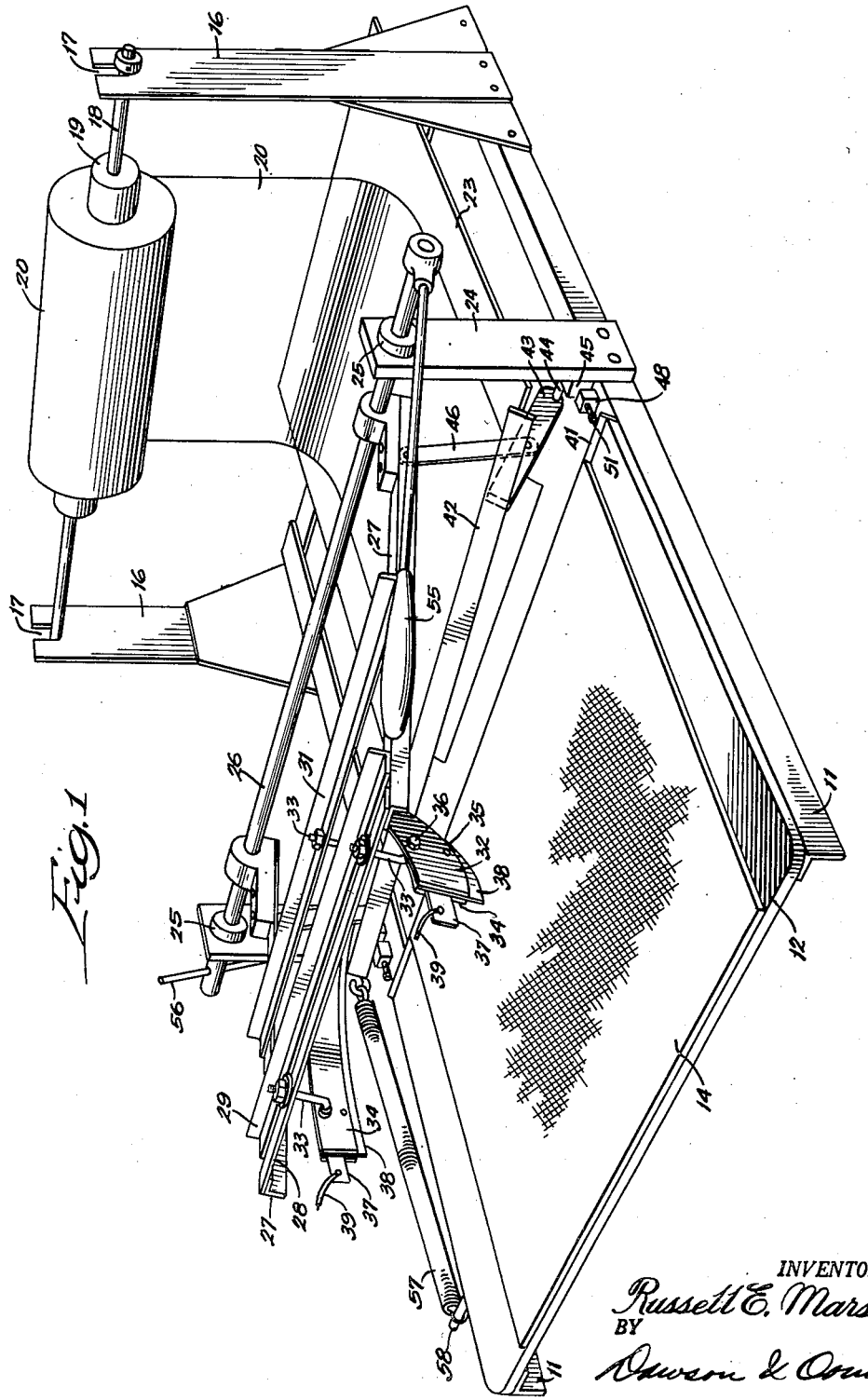

May 25, 1954   R. E. MARSH   2,679,280
PLASTIC BAG SEALING AND CUTTING MACHINE
Filed April 24, 1952   3 Sheets-Sheet 1

INVENTOR:
Russell E. Marsh,
BY
Dawson & Ooms,
ATTORNEYS.

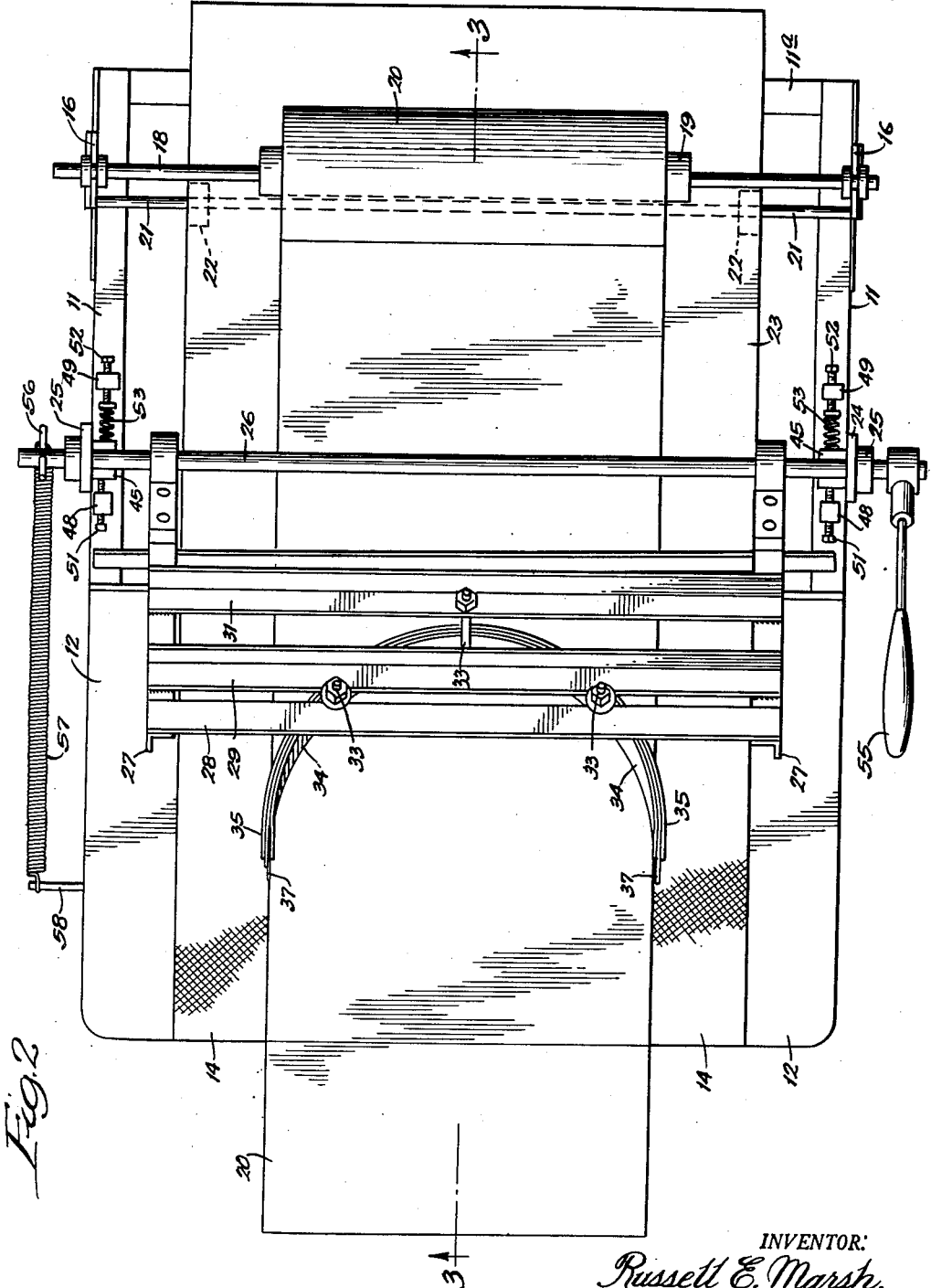

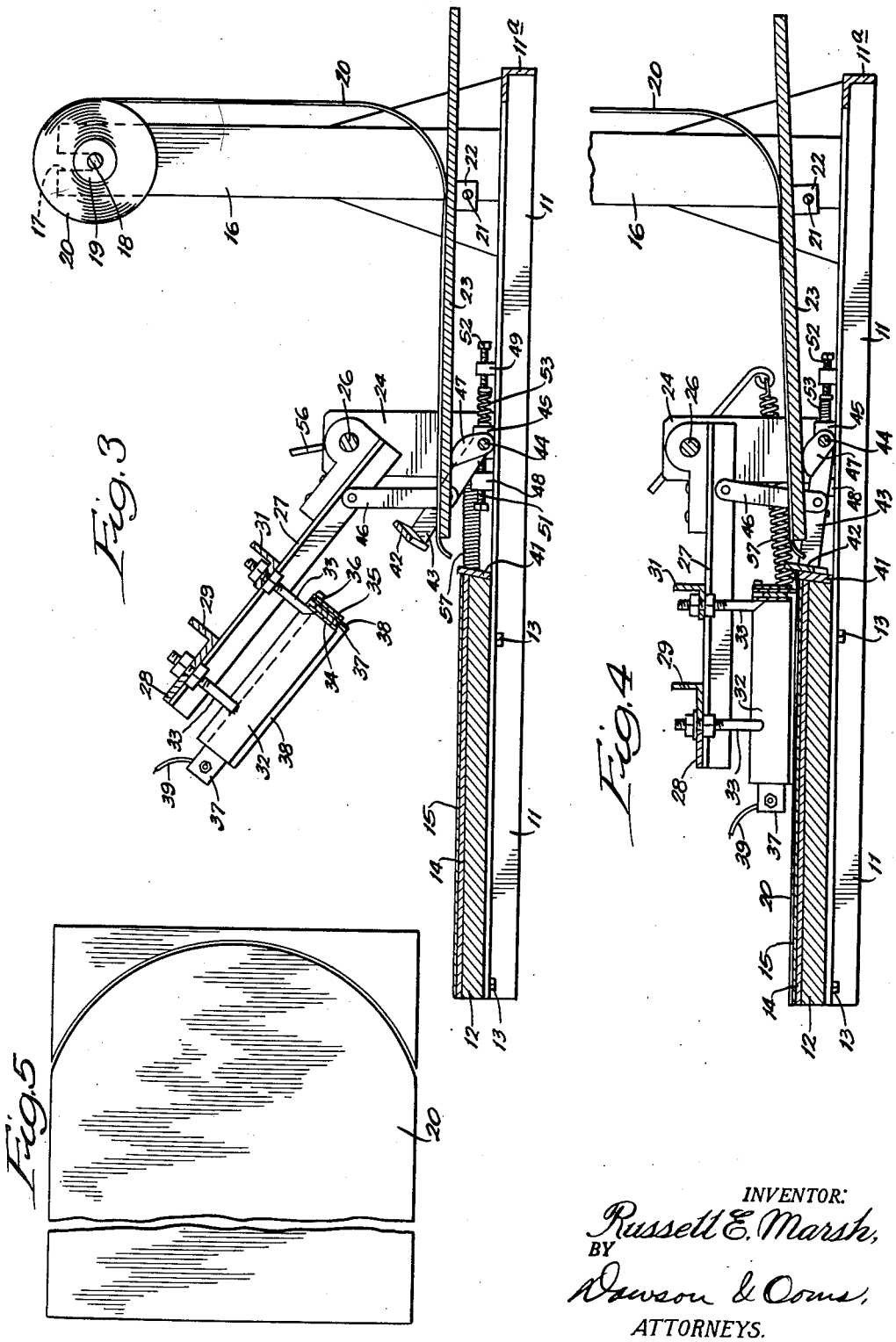

Patented May 25, 1954

2,679,280

UNITED STATES PATENT OFFICE 2,679,280

PLASTIC BAG SEALING AND CUTTING MACHINE

Russell E. Marsh, Northbrook, Ill., assignor to Production Incorporated, Chicago, Ill., a corporation of Illinois Application April 24, 1952, Serial No. 284,038

2 Claims. (Cl. 154—42)

This invention relates to plastic-sealing machines; in particular, it concerns an improved machine for sealing and cutting plastic bags of various shapes.

Conventional machines for making bags out of tubular plastic stock, such seals being of any sealing bars which form transverse seals. Bags thus formed are ordinarily cut from the strip stock by suitable cutting knives, operated independently or in conjunction with the sealing bars.

It is an object of the present invention to provide apparatus for making transverse seals in tubular plastic stock, such as seals being of any desired shape.

Another object of the present invention is to provide a bag-making machine in which a narrow seal may be formed along the bottom of a plastic bag with no waste or tare material beyond the seal.

The achievement of this last-mentioned object is a particularly impressive accomplishment of the present invention. Often, in such applications as food packaging, it is desirable to provide a plastic bag conforming as nearly as possible to the actual contour of the object being packaged. Conventional plastic bags are not particularly satisfactory for such purposes because they are characterized by a rather elongated unsightly bottom seal, the width of the seal seam being in many cases as much as three-eighths inch. Furthermore, such bags often contain an additional eighth inch to quarter inch of waste or tare beyond the seal, since bags made by conventional methods cannot usually be cut through the seal itself because of the danger that a flaw in the seal will thereby be exposed. The machine of the present invention will make bags in which, when the bag is filled, the seam appears only as a very thin line, hardly distinguishable from the body of the bag either in thickness, texture, or color.

A further object of the present invention is to provide a bag-sealing machine in which cutting means are automatically operated in conjunction with the sealing means to control and define in each operation the precise amount of raw material to be discarded between the curved seal on the bottom of the bag and the transverse cut which forms the open end of the next bag.

A still further object of the invention is to provide a bag-sealing machine in which both cutting and sealing of the bottom of the bag is accomplished by a single heated element, the shape of which may be varied to any desired conformation according to the specifications of the bags.

Other objects and advantages of the present invention will appear from the detailed description of the invention which follows.

In the drawing, I have shown several views of an illustrative embodiment of my invention. Figure 1 is a perspective view of a typical machine embodying my invention and adapted for manual operation; Fig. 2 is a plan view of the machine of Fig. 1; Fig. 3 is a sectional view in the vertical plane of the machine of Fig. 1, the section being taken along the line 3—3 of Fig. 2; Fig. 4 is a sectional view similar to Fig. 3 but showing the moving parts of the machine in the position which they occupy at the instant the machine is sealing a bag; and Fig. 5 is a plan view showing a bag made on the machine of Fig. 1, as it appears immediately after withdrawal of the sealing element and prior to being removed from the machine.

Referring to the drawing, I have shown a machine adapted for use on a bench or other horizontal work position; my machine is constructed on a skeleton which may be formed of steel channels 11, reinforced by one or more transverse channels 11a. A wood table top or bed 12 is mounted in any suitable manner, such as screws 13, on the forward portion of the channels 11. A resilient pad 14, made of sponge rubber or other resilient material, is suitably affixed to the top surface of table 12. A top covering 15 for the pad 14 may be supplied in the form of a thin sheet of Teflon or other suitable high-temperature-resistant plastic material. To make it readily visible in the drawing, I have shown sheet 15 of exaggerated thickness; in practice, it will usually be a single thin sheet.

Near the extreme rear portion of channels 11, I have provided a pair of rigid uprights 16, preferably made of steel and suitably riveted, welded, or otherwise secured to channels 11. The upper ends of uprights 16 are provided with slots 17, which receive and serve as bearings for a shaft 18. Shaft 18 carries intermediate uprights 16 a spool 19 on which may be carried a long continuous strip of tubular plastic stock 20.

A rocker shaft 21 is suitably journaled into uprights 16 near their respective bases; shaft 21 carries pivoted on it a pair of fittings 22 which are secured by screws or other suitable means to a rocking table 23, which may be formed of wood, metal, or other material.

Uprights 24 are mounted on channels 11 approximately midway between the forward and rear ends of channels 11; uprights 24 are provided near their upper ends with bearings 25 which receive a transverse shaft 26.

Rigidly secured to shaft 26 are extensions 27, which may be formed of channel irons; extensions 27 extend forward from shaft 26 at right angles thereto and may be secured rigidly to shaft 26 by keying or any other desired means.

At their forward ends, extensions 27 are provided with a series of transverse channels 28, 29, and 31, welded or otherwise rigidly affixed to extensions 27. In the embodiment of the invention shown, channels 28 and 29 are spaced apart a short distance to provide between them a slot; channel 31 is drilled at its midpoint to provide a bolt-receiving aperture. A sealing element 32 is secured to channels 28, 29, and 31 by means of three bolts 33, one of which is positioned to be received in the central aperture of channel 31 and the other pair of which are positioned to be received within the slot between channels 28 and 29. Extensions 27 and channels 28, 29, and 31 form a movable frame for the support of sealing element 32.

The sealing element 32, in the embodiment shown, is substantially semi-circular in shape and is made up of a pair of mated steel members. The inner member 34 carries bolts 33, and the outer member 35 is secured to member 34 by means of bolts 36.

Between semi-circular members 34 and 35 are clamped an elongated electrical heating element 37 and a thin steel blade 38. Blade 38 may, if desired, be sharpened on its lower edge to knife keenness, although such a refinement is not necessary. The blade 38 will perform very well if made of a thin strip of steel, perhaps twenty-five thousandths of an inch in thickness, squared off on its lower edge.

Suitable wire connections 39 may be made between the electric heating element 37 and any suitable source of electrical current.

The height of bearings 25 and the position of sealing element 32 relative to channels 27 are proportioned so that the lower edge of blade 38 is in uniform contact with surface 15 along its entire length when channels 27 are fully lowered, as shown in Fig. 4.

Mounted transversely along the rear face of table 12 is a fixed knife blade 41, extending across substantially the entire width of the machine.

A movable cutting blade 42 is mounted for cooperation with fixed blade 41; it is carried at the ends of a pair of pivoted members 43 which are keyed or otherwise rigidly affixed to a shaft 44 journaled in bearings 45 mounted on channels 11. Members 43 are provided, intermediate their ends, with pivots on which are carried links 46, the upper ends of which are in turn pivoted to channels 27.

Spaced at any desired positions along shaft 44 are a pair of cams 47 which are keyed to shaft 44 and which bear on the under side of rocker table 23.

As may be best seen from Figs. 3 and 4, cams 47 normally hold the forward end of rocker table 23 substantially above the level of table 12, but, when the sealing member 32 is in its lowered position, as shown in Fig. 4, the cams 47 permit the rocker table 23 to move downward until its forward end is almost on a level with table 12.

The bearings 45, which receive shaft 44, are adjustably spring-mounted between a pair of studs or bosses 48 and a corresponding pair of bosses 49. Bolts 51 and 52 serve as adjusting means permitting manual variation of the relative positions of movable blade 42 and fixed blade 41. Further, springs 53 permit movable blade 42 to engage fixed blade 41, during the downward travel of sealing member 32, at a point near one end of blade 41 and to engage the blade 41 gradually along its length in a shearing action during the further downward movement of sealing element 32. In that action, one of the springs 53 will be compressed as bearing 45 slides backward. This action is brought out clearly in Figs. 3 and 4. Shaft 26 is extended at both ends beyond bearings 25. At one end, the shaft 26 is provided with a handle 55 which is keyed to the shaft and which projects forward therefrom at a convenient angle for manual actuation. At the other end of shaft 26 it is provided with a transverse extension 56 which serves as one seat for a counterweighting spring 57, the other end of which is seated on a pin 58 carried on one of the channels 11.

Counterweight spring 57 may be adjusted so as to hold the sealing apparatus 32 normally in the raised position shown in Figs. 1 and 3 but permitting the sealing element 32 to be moved downward into the lowered position of Fig. 4 by application of small manual force on handle 55.

*Operation*

In the operation of my invention, plastic stock 20 is drawn forward until its end is flush with some arbitrary point, such as the end of table 12 or an indexing mark placed thereon. The operator then lowers the sealing member 32 by depressing handle 55.

Before the apparatus is placed into use, electric current will have been supplied to heating element 32 via connecting wires 39, and the sealing blade 38 will have been heated to a temperature substantially above the melting temperature of the plastic material in use.

Most plastics used in packaging, such as polyethylene, melt at a temperature in the neighborhood of 225° F. The temperature to which blade 38 should be heated is not critical, but I have found that 375° F. is a highly satisfactory value, giving good performance, rapid sealing, and operator comfort.

When blade 38 engages the top sheet of plastic stock 20 and presses the same against sheet 15 (see Fig. 4), a narrow seam seal is formed in tubular stock 20 along the entire line of engagement between blade 38 and the plastic stock. At the same time, the hot blade cuts through the tubular stock and severs the newly formed bag from the plastic material behind blade 38.

An equivalent seal is also formed in the tare portion of stock lying behind the blade 38.

At the time the sealing blade 38 moves downward into engagement with the stock 20, blade 42 traps the strip of plastic stock between it and fixed blade 41, shearing it squarely off and leaving a square end to the main body of the sheet stock 20.

After the seal has been formed, which usually requires only a second or two, the operator releases handle 55 and spring 57 at once pulls the sealing apparatus to its raised position, carrying with it at the same time the movable blade 42. The operator then removes the completed bag from table 12, and at the same time, with the other hand, removes the tare portion which lies on table 12 back of sealing member 32. The operator then grasps the free end of the main stock 20 (which she can grasp at the end of rocker table 23 without coming in contact with the cutting blade 41). The stock is then drawn forward to the desired point and the operation is repeated to make another bag.

It will be understood that my invention may be adapted to form narrow seam seals, severed from stock, of any desired shape. In the drawing, for purposes of illustration, I have shown a sealing member having a blade formed in substantially semi-circular shape. In other applications, however, different shapes of seals will be desirable, and for that purpose the sealing head 32 may be replaced by other sealing heads having any desired conformation. The flexible mounting means comprising channels 28, 29, and 31 is designed to make the substitution of other sealing heads.

It should be noted, as a particular advantage of the present invention, that the cooperative action of the sealing head 32 and the cutting blade 42 defines for each operation the precise quantity of waste material. This cooperative action makes possible maximum economy of stock consumption, by maintaining the waste at a controlled low figure.

If desired, the sealing head 32 may be sheathed in asbestos or other suitable heat-insulating material. Such a construction will reduce heat dissipation from the sealing head, thus contributing both to economy of operation and operator comfort. It is understood, of course, that the edge of blade 38 which engages the tubular sheet stock will not be covered.

It will be understood that persons skilled in the art may make numerous changes in the details of my invention without departing from its spirit; it is accordingly my desire that the scope of my invention be determined primarily with reference to the appended claims.

I claim:

1. A bag-making machine comprising a substantially flat bed provided with a resilient heat-resistant surface, a frame supported over said bed and adapted to be lowered into engagement therewith, a sealing member carried by said frame, said sealing member comprising a thin metal blade having an edge shaped to conform to the desired contour of the bag bottom and comprising also a heating element for heating said blade to a temperature above 225° F., manually operable means for bringing the frame and the bed into engagement, said sealing member being positioned on said frame to provide an edge-to-surface contact between said blade edge and said bed, stationary cutting means rigidly joined to said bed behind the zone of engagement between said sealing member and said bed, movable means mounted for cooperation with said stationary cutting means, mechanical linkage joining said frame and said movable means operative when the frame is lowered to bring said movable means into engagement with said stationary cutting means, and means supporting a supply of tubular plastic stock for passage between said movable means and said stationary cutting means and thence onto the surface of said bed below said frame.

2. A bag-making machine comprising a substantially flat bed provided with a resilient heat-resistant surface, a frame supported over said bed and adapted to be lowered into engagement therewith, a sealing member carried by said frame, said sealing member comprising a thin metal blade having an edge shaped to conform to the desired contour of the bag bottom and comprising also a heating element for heating said blade to a temperature above 225° F., manually operable means for bringing the frame and the bed into engagement, said sealing member being positioned on said frame to provide an edge-to-surface contact between said blade edge and said bed, stationary cutting means rigidly joined to said bed behind the zone of engagement between said sealing member and said bed, movable means mounted for cooperation with said stationary cutting means, mechanical linkage joining said frame and said movable means operative when the frame is lowered to being said movable means into engagement with said stationary cutting means, a rocker table rockably supported by said frame behind said stationary cutting means, rocking means engaging said rocker table and moving with said movable means operative when said frame is lowered to lower the forward edge of said rocker table substantially to the level of said bed and operative when said frame is raised to raise said rocker table substantially above the level of said bed and said stationary cutting means, and means for supporting a supply of tubular plastic stock for passage thereof over the surface of said rocker table, between said movable means and said stationary cutting means, and thence onto the surface of said bed below said frame.

References Cited in the file of this patent

UNITED STATES PATENTS

| Number | Name | Date |
|--------|------|------|
| 1,353,421 | Riley | Sept. 21, 1920 |
| 2,177,452 | Robinson et al. | May 17, 1938 |
| 2,185,647 | Penn et al. | Jan. 2, 1940 |
| 2,195,583 | Schultz et al. | Apr. 2, 1940 |
| 2,229,121 | Nye et al. | Jan. 21, 1941 |
| 2,232,640 | Schwartzman | Feb. 18, 1941 |
| 2,375,330 | Sperry | May 8, 1945 |
| 2,438,156 | Dodge | Mar. 23, 1948 |
| 2,444,685 | Waters | July 6, 1948 |
| 2,535,029 | Atanasoff et al. | Dec. 26, 1950 |
| 2,556,008 | Spalding | June 5, 1951 |